(12) United States Patent
Kobayashi et al.

(10) Patent No.: US 8,679,656 B2
(45) Date of Patent: Mar. 25, 2014

(54) LUBRICANT AND MAGNETIC DISK

(75) Inventors: Nagayoshi Kobayashi, Kobe (JP); Tsuyoshi Shimizu, Kobe (JP)

(73) Assignee: Moresco Corporation, Hyogo (JP)

( * ) Notice: Subject to any disclaimer, the term of this patent is extended or adjusted under 35 U.S.C. 154(b) by 276 days.

(21) Appl. No.: 13/059,731

(22) PCT Filed: Sep. 3, 2009

(86) PCT No.: PCT/JP2009/065776
§ 371 (c)(1),
(2), (4) Date: Feb. 18, 2011

(87) PCT Pub. No.: WO2010/027096
PCT Pub. Date: Mar. 11, 2010

(65) Prior Publication Data
US 2011/0143165 A1   Jun. 16, 2011

(30) Foreign Application Priority Data
Sep. 5, 2008 (JP) ................. 2008-228634

(51) Int. Cl.
*G11B 5/66* (2006.01)

(52) U.S. Cl.
USPC .......... 428/835.8; 508/422; 508/582

(58) Field of Classification Search
None
See application file for complete search history.

(56) References Cited

U.S. PATENT DOCUMENTS

| | | | | |
|---|---|---|---|---|
| 6,080,486 A | * | 6/2000 | Falcone et al. | 428/421 |
| 6,730,403 B1 | * | 5/2004 | Shirai et al. | 428/833.5 |
| 2003/0179490 A1 | | 9/2003 | Matsumoto et al. | |
| 2009/0023017 A1 | | 1/2009 | Tomiyasu et al. | |
| 2009/0291325 A1 | * | 11/2009 | Xu et al. | 428/800 |
| 2010/0136371 A1 | * | 6/2010 | Shimizu et al. | 428/833 |

FOREIGN PATENT DOCUMENTS

| | | |
|---|---|---|
| JP | 2000-260017 | * 1/2000 |
| JP | 2002-275484 | 9/2002 |
| JP | 2002-293787 | 10/2002 |
| JP | 2002-294266 | 10/2002 |
| JP | 2003-132520 | 5/2003 |
| JP | 2003-288715 | 10/2003 |

(Continued)

OTHER PUBLICATIONS

Zhang et al., "Relationship between the molecular structures of lubricants and their performance at the head-disk interface of hard disk drives," May 2003, Wear, 254, pp. 321-331.*

(Continued)

*Primary Examiner* — Holly Rickman
(74) *Attorney, Agent, or Firm* — Wenderoth, Lind & Ponack, L.L.P.

(57) ABSTRACT

A lubricant containing a compound of the formula (I)

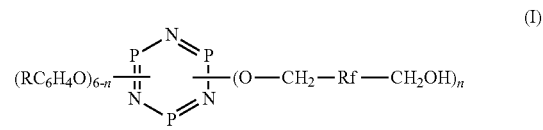

wherein n is substantially 2, 3 or 4, R is $C_{1-4}$ fluoroalkyl and Rf is $-CF_2O(CF_2CF_2O)_x(CF_2O)_yCF_2-$ or $-CF_2CF_2O(CF_2CF_2CF_2O)_zCF_2CF_2-$ in which x, y and z are each 0 or a positive real number to give a number average molecular weight of 500 to 2000 to a fluoropolyether of the formula $HOCH_2-Rf-CH_2OH$ including said Rf, the fluoropolyether having a molecular weight distribution (PD, weight average molecular weight/number average molecular weight) of 1.0 to 1.5.

7 Claims, 1 Drawing Sheet

(56) References Cited

FOREIGN PATENT DOCUMENTS

| | | | |
|---|---|---|---|
| JP | 2003-52999 | * | 12/2004 |
| WO | WO2006-009057 | * | 1/2006 |
| WO | WO 2007-043450 | * | 4/2007 |

OTHER PUBLICATIONS

International Search Report issued Dec. 1, 2009 in International (PCT) Application No. PCT/JP2009/065776.

* cited by examiner

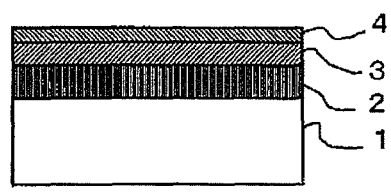

LUBRICANT AND MAGNETIC DISK

This application is a U.S. national stage of International Application No. PCT/JP2009/065776 filed Sep. 3, 2009.

TECHNICAL FIELD

The present invention relates to perfluoropolyether lubricants having a cyclophosphazene group and hydroxyl groups in the molecule and magnetic disks having the lubricant applied thereto.

BACKGROUND ART

With an increase in the recording density of magnetic disks, the distance between the magnetic disk serving as a recording medium and the head for use in recording of information or playback has become almost nil close to contact therebetween. The magnetic disk is provided over the surface thereof with a carbon protective film or lubricant film for the purpose of diminishing abrasion due to the contact or sliding of the head thereon or preventing contamination of the disk surface.

The carbon protective film is produced generally by the sputtering process or CVD process. Since the disk surface is protected with the two films, i.e., the carbon protective film and the lubricant film thereover, the interaction between the carbon protective film and the lubricant is important.

The lubricants generally in use are perfluoropolyethers having functional groups. Examples of functional groups are hydroxyl, amino and cyclophosphazene group. More specific examples of lubricants include Fomblin ZTETRAOL manufactured by Solvay Solexis Inc. and having hydroxyl, and PHOSFAROL A20H, product of MORESCO Corporation and having both hydroxyl and cyclophosphazene groups.

Particularly, lubricants having a phosphazene group are materials having high resistance to decomposition and known as materials for giving high durability to magnetic disks (for example, Patent Literature 1, 2). However, with reference to the lubricant of Patent Literature 1, claim 1 therein defines a compound wherein n is an integer of 1 to 5, whereas the preparation process of the patent concerned affords only a mixture which is not satisfactory in lubricating performance. With the lubricant of Patent Literature 2, a cyclophosphazene ring has a fluoropolyether main chain wherein the number of substituent is 1, and the lubricant is low in bonded ratio as listed in Table 1 given later.

Patent Literature 1: JP2000-260017A
Patent Literature 2: JP2004-352999A

Under the condition wherein the head is at such a distance from the disk that it is almost in contact therewith, the use of the lubricant having a phosphazene group and highly resistant to decomposition involves the problem that the head needs to be prevented from moving into contact with the disk. Heretofore proposed as means for dissolving this problem are techniques for causing the lubricant to adsorb to the carbon protective film more effectively by incorporating at least two hydroxyl groups or like polar groups into the molecule (for example, Patent Literature 3, 4). However, introduction of an increased number of hydroxyl or like polar groups results in enhanced interaction with the carbon protective film to thereby conversely impair the flowability of the lubricant. In the case of serious impairment of flowability, insufficient lubricity will result under the lubricating condition wherein the head is nearly in contact with the disk, possibly reducing the durability of the magnetic disk.

Patent Literature 3: WO2006009057
Patent Literature 4: WO2007043450

An object of the present invention is to provide a fluoropolyether lubricant which has a cyclophosphazene group and hydroxyl in the molecule and wherein the fluoropolyether is given a narrowed molecular weight distribution so as to make the lubricant resemble single compounds and thereby render the lubricant satisfactory in both adsorption to the disk surface and flowability thereon.

SUMMARY OF THE INVENTION

The present invention provides the following.

1. A lubricant containing a compound of the formula (I)

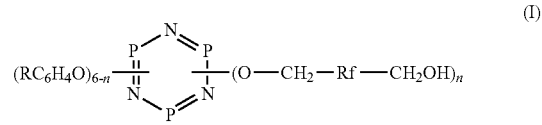

(I)

wherein n is substantially 2, 3 or 4, R is $C_{1-4}$ fluoroalkyl and Rf is —$CF_2O(CF_2CF_2O)_x(CF_2O)_yCF_2$— or —$CF_2CF_2O(CF_2CF_2CF_2O)_zCF_2CF_2$— in which x, y and z are each 0 or a positive real number to give a number average molecular weight of 500 to 2000 to a fluoropolyether of the formula $HOCH_2$—Rf—$CH_2OH$ including said Rf, the fluoropolyether having a molecular weight distribution (PD, weight average molecular weight/number average molecular weight) of 1.0 to 1.5.

2. A magnetic disk comprising a substrate having at least a recording layer and a protective layer formed thereover and a lubricating layer provided over the resulting surface, the lubricating layer containing a compound of the formula (I).

3. A process for preparing a fluoropolyether of the formula (I) having a cyclophosphazene group and hydroxyl in the molecule, the process comprising reacting a straight-chain fluoropolyether represented by the formula $HOCH_2$—Rf—$CH_2OA$ wherein A is an ester group or silyl group or alkoxyl group and having hydroxyl at one of opposite terminals and an ester group or silyl group or alkoxyl group at the other terminal with a cyclophosphazene compound represented by the formula $(RC_6H_4O)_{6-n}$—$(P_3N_3)$—$X_n$ and having n halogen atoms

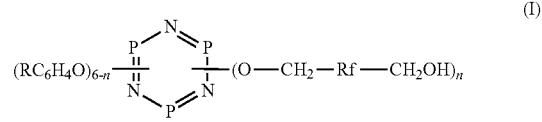

(I)

wherein n is substantially 2, 3 or 4, R is $C_{1-4}$ fluoroalkyl and Rf is —$CF_2O(CF_2CF_2O)_x(CF_2O)_yCF_2$— or —$CF_2CF_2O(CF_2CF_2CF_2O)_1CF_2CF_2$— in which x, y and z are each 0 or a positive real number to give a number average molecular weight of 500 to 2000 to a fluoropolyether of the formula $HOCH_2$—Rf—$CH_2OH$ including said Rf, the fluoropolyether having a molecular weight distribution (PD, weight average molecular weight/number average molecular weight) of 1.0 to 1.5.

4. A process for preparing a fluoropolyether of the formula (I) having a cyclophosphazene group and hydroxyl in the molecule, the process comprising reacting a fluoropolyether compound of the formula $HOCH_2$—Rf—$CH_2OH$ with a compound reactive with hydroxyl for forming an ester group or silyl group or alkoxyl group to obtain a straight-chain fluoropolyether represented by the formula $HOCH_2$—Rf—$CH_2OA$ wherein A is an ester group or silyl group or alkoxyl group and having hydroxyl at one of opposite terminals and an ester group or silyl group or alkoxyl group at the other terminal, and reacting the straight-chain fluoropolyether with a cyclophosphazene compound represented by the formula $(RC_6H_4O)_{6-n}$—$(P_3N_3)$—$X_n$ and having n halogen atoms

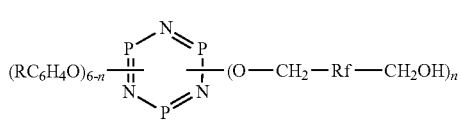

(I)

wherein n is substantially 2, 3 or 4, R is $C_{1-4}$ fluoroalkyl and Rf is —$CF_2O(CF_2CF_2O)_x(CF_2O)_yCF_2$— or —$CF_2CF_2O(CF_2CF_2CF_2O)_zCF_2CF_2$— in which x, y and z are each 0 or a positive real number to give a number average molecular weight of 500 to 2000 to a fluoropolyether of the formula $HOCH_2$—Rf—$CH_2OH$ including said Rf, the fluoropolyether having a molecular weight distribution (PD, weight average molecular weight/number average molecular weight) of 1.0 to 1.5.

[1-1] Process for Preparing Lubricant

The lubricant of the invention containing a compound of the formula (I) is obtained, for example, by reacting a straight-chain fluoropolyether having hydroxyl at one of opposite terminals and an ester group or silyl group or alkoxyl group at the other terminal with a cyclophosphazene halide compound substituted with phenoxy group. Stated more specifically, the lubricant is prepared by the process to be described below.

(a) Preparation of straight-chain fluoropolyether having hydroxyl at one terminal and an ester group, silyl group or alkoxyl group at the other terminal A straight-chain fluoropolyether having hydroxyl at opposite terminals is mixed with a compound reactive with hydroxyl to produce an ester group or silyl group or alkoxyl group, and the mixture is stirred with heating. The reaction temperature is 10 to 60° C., preferably 20 to 40° C. The reaction time is 2 to 20 hours, preferably 10 to 15 hours. The compound for forming an ester group or silyl group or alkoxyl group is used preferably in an amount of 0.5 to 1.5 equivalents relative to the fluoropolyether. Imidazole or like reaction promoting agent may be used. The reaction mixture is thereafter purified, for example, by column chromatography to obtain a straight-chain fluoropolyether having hydroxyl at one terminal and an ester group, silyl group or alkoxyl group at the other terminal.

The fluoropolyether having hydroxyl at opposite terminals can be, for example, a compound of the formula $HOCH_2$—Rf—$CH_2OH$ wherein Rf is —$CF_2O(CF_2CF_2O)_x(CF_2O)_yCF_2$— or - or $CF_2F_2O(CF_2CF_2CF_2CF_2F_2$—.

The fluoropolyether is 500 to 2000, preferably 500 to 1500, more preferably 800 to 1200, in number average molecular weight. The number average molecular weight mentioned is a value measured by $^{19}$F-NMR using JNM-ECX400, product of JEOL Ltd. For NMR measurement, the sample itself was used without dilution with a solvent. As a reference for chemical shift, a known peak was used which is a portion of fluoropolyether skeleton structure.

x is a real number of 0 to 17, preferably 1 to 12, more preferably 1 to 10. y is a real number of 0 to 30, preferably 0 to 22 and more preferably 0 to 18. z is a real number of 3 to 12, preferably 3 to 9, more preferably 4 to 7.

The fluoropolyether of the foregoing formula $HOCH_2$—Rf—$CH_2OH$ is a compound having a molecular weight distribution. The molecular weight distribution (PD), which is weight average molecular weight/number average molecular weight, is 1.0 to 1.5, preferably 1.0 to 1.4, and more preferably 1.0 to 1.3. The molecular weight distribution is a characteristic value obtained by using HPLC-8220GPC, product of Tosoh Co., Ltd., column (PLgel Mixed E), product of Polymer Laboratories, eluent which is HCFC-type alternative CFC and a non-functional perfluoropolyether serving as a reference material.

Examples of compounds reactive with hydroxyl for forming an ester group or silyl group or alkoxyl group are acid anhydrides, silyl halides, alkyl halides, ether compounds, etc.

Examples of acid anhydrides are a compound represented by $R^aOR^b$ ($R^a$ and $R^b$ are the same or different and are $CH_3CO$, $PhCO$, $CH_3SO_2$, $PhSO_2$, $CF_3CH_2CO$ or $CH_3C_6H_4SO_2$, Ph is phenyl), maleic anhydride, succinic anhydride and phthalic anhydride. Concrete examples are trifluoromethylacetic anhydride, benzoic anhydride, p-toluenesulfonic anhydride, trifluoromethanesulfonic anhydride, acetic anhydride, maleic anhydride, succinic anhydride, phthalic anhydride, acetic benzoic anhydride, methanesulfonic anhydride and benzenesulfonic anhydride.

Examples of silyl halides are compounds represented by $(R^c)_3SiY$, $R^d(R^e)_2SiY$ and $R^dR^eR^gSiY$ ($R^c$ is alkyl having 1 to 4 carbon atoms or phenyl, $R^d$ is alkyl having 1 to 18 carbon atoms, alkoxy having 1 to 4 carbon atoms, phenyl, benzyl, pentafluorophenyl, cyanopropyl or vinyl, $R^e$ is alkyl having 1 to 2 carbon atoms or phenyl, $R^g$ is alkyl having 1 to 4 carbon atoms substituted by phenyl). Concrete examples are trimethylsilyl chloride, triethylsilyl chloride, triisopropylsilyl chloride, t-butyl-dimethylsilyl chloride, t-butyldiphenylsilyl chloride, (3-cyanopropyl)dimethylchlorosilane, benzylchlorodimethylsilane, butyldimethylchlorosilane, chloro(decyl)dimethylsilane, chloro(dodecyl)dimethylsilane, chlorodimethyl(3-phenylpropyl)silane, chlorodimethylphenylsilane, chlorodimethylpropylsilane, chlorodimethylvinylsilane, diethylisopropylsilyl chloride, dimethyl-n-octylchlorosilane, dimethylethylsilyl chloride, dimethylisopropylchlorosilane, dimethyloctadecylchlorosilane, diphenylmethylchlorosilane, methyloctadecyl(3-phenylpropyl)-chlorosilane, pentafluorophenyldimethylchlorosilane, t-butoxy-diphenylchlorosilane, t-butyldiphenylchlorosilane and triphenylchlorosilane.

Examples of alkyl halides are a compound represented by AY (A is alkyl having 1 to 5 carbon atoms, Y is a halogen such as chlorine, bromine and iodine). Concrete examples are methyl halides, ethyl halides, propyl halides, butyl halides and pentyl halides such as iodomethane, 1-bromopropane, 2-bromopropane, 1-iodopropane, 2-iodopropane, 1-bromo-2-methylpropane, 1-bromobutane, 2-bromo-2-methylpropane, 2-bromobutane, 1-iodo-2-methylpropane, 1-iodobutane, 2-iodo-2-methylpropane, 2-iodobutane, 1-iodo-2-methylbutane, 1-iodo-3-methylbutane, 1-bromo-3-methylbutane, 1-bromopentane, 2-bromo-2-methylbutane and 3-bromopentane.

Examples of ether compounds are chloromethyl methyl ether, 2-methoxyethoxymethyl chloride, benzyl chloromethyl ether, 3,4-dihydro-2H-pyran and ethyl vinyl ether.

(b) Preparation of Lubricant of the Invention

The fluoropolyether obtained by the above procedure (a) and a cyclophosphazene of the formula $(RC_6H_4O)_{6-n}$—$(P_3N_3)$—$X_n$ having n halogen atoms are stirred with heating along with sodium or like alkali metal. n is 2, 3 or 4, and the cyclophosphazene material is at least 80%, preferably at least 90%, in purity. The reaction temperature is 30 to 100° C., preferably 50 to 80° C. The reaction time is 20 to 100 hours, preferably 50 to 80 hours. It is desirable to use 0.5 to 2.0 equivalents of the perfluoropolyether obtained by the foregoing procedure (a) and 0.5 to 2.0 equivalents of the alkali metal relative to the halogen atoms. The reaction may be conducted in a solvent, followed, for example, by washing with water and dewatering. The ester group, silyl group or hydroxyl group remaining at one terminal of the perfluoropolyether is thereafter removed as by hydrolysis for deprotection (removal of the ester or silyl or hydroxyl group), followed by fractionation by column chromatography to obtain the desired compound as a fraction. R in the substituent of the cyclophosphazene of the formula $(RC_6H_4O)_{6-n}$—$(P_3N_3)$—$X_n$ is a fluoroalkyl group having 1 to 4 carbon atoms, such as perfluoroalkyl, 1,1,2,2-tetrafluoroethyl, 1,1,2,2,3,3-hexafluoropropyl and 1,1,2,2,3,3,4,4-octafluorobutyl having 1 to 4 carbon atoms. The position of the substitution with R may be any of the ortho, meta and para positions.

In the cyclophosphazene of the formula $(RC_6H_4O)_{6-n}$—$(P_3N_3)$—$X_n$ having n halogen atoms, X can be, for example, chlorine, bromine or iodine.

When the lubricant of the present invention is to be used for magnetic disks, n is preferably 2, 3 or 4, more preferably 3 or 4, and most preferably 3.

The compound of the present invention is applied to the magnetic disk surface by diluting the compound with a solvent and coating the disk surface with the diluted compound. Examples of useful solvents are PF-5060, PF-5080, HFE-7100, HFE-7200 and HFE-7300 manufactured by 3M, Vertrel-XF, product of DuPont, etc. The concentration of the compound as diluted is up to 1 wt. %, preferably 0.001 to 0.1 wt. %.

While the compound of the invention is usable singly, the compound can be used also as mixed in a desired ratio with another material, such as Fomblin Zdol, Ztetraol, Zdol TX, AM manufactured by Solvay Solexis, Demnum manufactured by Daikin Industries, Ltd., Krytox manufactured by DuPont, or the like.

The compound of the present invention enables the head to be spaced by a small distance from the magnetic disk inside magnetic disk devices and is useful as a lubricant for giving improved durability under a sliding condition. The compound of the invention is characterized by the interaction of the hydroxyl at the terminal of the molecule with the polar site present in the carbon protective film and by the interaction of the aromatic group in the molecular chain with carbon unsaturated bonds present in the carbon protective film. Accordingly, the compound is usable as a surface protective film for magnetic heads, photomagnetic recording devices, magnetic tapes, plastics and like organic materials having a carbon protective film, and also as a surface protective film for inorganic materials such as $Si_3N_4$, SiC and $SiO_2$.

FIG. 1 shows a sectional view schematically showing the magnetic disk of the invention. The magnetic disk of the invention comprises a substrate 1, at least one recording layer 2 formed on the substrate 1, a protective layer 3 on the recording layer 2 and a lubricant layer 4 formed thereon, as an outermost layer, which contains the lubricant of the invention. The substrate is composed of aluminum alloy, glass and like ceramics, polycarbonate or the like.

The recording layer of the magnetic disk, i.e., the magnetic layer is composed of mainly elements capable of foiluing ferromagnetic bodies, such as iron, cobalt or nickel, alloy or oxide containing chromium, platinum or tantalum in addition to such elements. These materials are applied by, e.g., a plating method or a sputtering method. The protective layer is formed of carbon, SiC, $SiO_2$ or the like. The layer is formed by a sputtering method or CVD method.

Lubricant layers presently available are up to 30 Å in thickness, so that when a lubricant having a viscosity of higher than about 100 mPa·s at 20° C. is applied as it is, the resulting film is likely to have an excessively large thickness. Accordingly the lubricant for use in coating is used as dissolved in a solvent. When the compound of the present invention is applied as dissolved in a solvent, the film thickness to be obtained is easy to control in the case where the present compound serves singly as a lubricant and also in the case where the compound is used as mixed with other lubricant. The concentration varies with the method and conditions of application, mixing ratio, etc. The lubricant film of the present invention is preferably 5 to 15 Å in thickness.

In order to assure the lubricant of improved adhesion to the ground layer, the lubricant applied can be subjected to heat treatment or ultraviolet treatment. The heat treatment is conducted at 60 to 150° C., preferably at 80 to 150° C. The ultraviolet treatment is conducted using ultraviolet rays of 185 nm and 254 nm in main wavelength.

The magnetic disk of the invention can be applied to a magnetic disk apparatus which can accommodate the disk and which is provided with a magnetic disk drive including a head for recording, reproducing and erasing information and a motor for rotating the disk; and with a control system for controlling the drive. Examples of recording methods of magnetic disk devices are in-plane magnetic recording, perpendicular magnetic recording and heat-assisted magnetic recording. The lubricant is applicable also to discrete-track magnetic disks and bit-patterned magnetic disks.

BRIEF DESCRIPTION OF THE DRAWING

FIG. 1 is a section view showing the structure of the magnetic disk of the invention. Indicated at 1 is a substrate; at 2, a recording layer; at 3, a protective layer; and at 4, a lubricant layer.

BEST MODE FOR CARRYING OUT THE INVENTION

The invention will be described in more detail with reference to the following examples and test examples to which, however, the invention is not limited.

EXAMPLE 1

Preparation of (m—$CF_3$—$C_6H_4O)_3$—$(P_3N_3)$—(O—$CH_2$—Rf—$CH_2OH)_3$ (Lubricant 1)

Rf is —$CF_2O(CF_2CF_2O)_x(CF_2O)_yCF_2$—

Dimethylformaldehyde (45 g), 90 g of a fluoropolyether (1056 in number average molecular weight, 1.25 in molecular weight distribution) of the formula $HOCH_2$—$CF_2O$ $(CF_2CF_2O)_x(CF_2O)_yCF_2CH_2$—OH, triisopropylsilyl chloride (14 g) and imidazole (6 g) were stirred in an argon atmosphere at 30° C. for 12 hours. The reaction mixture was thereafter washed with water, dewatered and purified by silica gel column chromatography to obtain 50 g of a compound having one hydroxyl group at one terminal and a triisopropylsilyl group at the other terminal. The compound (50 g) was dissolved in ditrifluoromethylbenzene (140 g), 7 g of cyclophosphazene of the formula (m-$CF_3$—$C_6H_4O)_3$—$(P_3N_3)$—$Cl_3$ having 3 chlorine atoms and metallic sodium (1.1 g) were added to the solution, and the mixture was stirred at 70° C. for 70 hours. The reaction mixture was then washed with water, and 1M tetrahydrofurane solution (33 g) of tetrabutylammonium fluoride was admixed with the mixture, followed by purification by column chromatography, whereby 10 g of the desired lubricant 1 was obtained.

Lubricant 1 was a colorless transparent liquid and 1.75 g/cm$^3$ in density at 20° C. Lubricant 1 was identified by NMR with the result shown.

$^{19}$F-NMR (solvent: none, reference material: OCF$_2$C$\underline{F}_2$CF$_2$O in the obtained product being taken as −125.8 ppm):

δ=−52.1, −53.7, −55.4 ppm

[28F, —OC$\underline{F}_2$O—]

δ=−64.1 ppm

[9F, (C$\underline{F}_3$C$_6$H$_4$O)$_3$—P$_3$N$_3$—(OCH$_2$CF$_2$—)$_3$],

δ=−78.7 ppm, −80.7 ppm

[6F, (CF$_3$C$_6$H$_4$O)$_3$—P$_3$N$_3$—(OCH$_2$C$\underline{F}_2$—)$_3$],

δ=−81.3 ppm, −83.3 ppm

[6F, —C$\underline{F}_2$CH$_2$OH],

δ=−89.1 ppm, −90.7 ppm

[59F, —OC$\underline{F}_2$C$\underline{F}_2$O—]

x=4.9 y=4.7

$^1$H-NMR (solvent: perfluorobenzene, reference material: D$_2$O):

δ=3.38~3.83 ppm

[12H, —CF$_2$C$\underline{H}_2$OH, (CF$_3$C$_6$H$_4$O)$_3$—P$_3$N$_3$—(OC$\underline{H}_2$CF$_2$—)$_3$]

δ=4.35~4.46 ppm

[3H, —CF$_2$CH$_2$O$\underline{H}$],

δ=6.78~7.35 ppm

[12H, (CF$_3$C$_6$$\underline{H}_4$O)$_3$—P$_3$N$_3$—(OCH$_2$CF$_2$—)$_3$]

EXAMPLE 2

Preparation of (m—CF$_3$—C$_6$H$_4$O)$_3$—(P$_3$N$_3$)—(O—CH$_2$—Rf—CH$_2$OH)$_3$ (Lubricant 2)

Rf is —CF$_2$CF$_2$O(CF$_2$CF$_2$CF$_2$O)$_z$CF$_2$CF$_2$—

The procedure of Example 1 was repeated with the exception of using a fluoropolyether (992 in number average molecular weight, 1.28 in molecular weight distribution) of the formula HOCH$_2$—CF$_2$CF$_2$O(CF$_2$CF$_2$CF$_2$O)$_z$CF$_2$CF$_2$CH$_2$—OH, whereby 10 g of the desired Lubricant 2 was obtained.

Lubricant 2 was a colorless transparent liquid and had a density of 1.79 g/cm$^3$ at 20° C. Lubricant 2 was identified by NMR with the result shown.

$^{19}$F-NMR (solvent: none, reference material: OCF$_2$C$\underline{F}_2$CF$_2$O in the obtained product being taken as −129.7 ppm):

δ=−83.7 ppm

[52F, —C$\underline{F}_2$CF$_2$C$\underline{F}_2$O—],

δ=−86.2 ppm

[6F, (CF$_3$C$_6$H$_4$O)$_3$—P$_3$N$_3$ OCH$_2$CF$_2$C$\underline{F}_2$)$_3$],

δ=−86.4 ppm

[6F, —C$\underline{F}_2$CF$_2$CH$_2$OH],

δ=−123.6 ppm

[6F, (CF$_3$C$_6$H$_4$O)$_3$—P$_3$N$_3$—(OCH$_2$C$\underline{F}_2$CF$_2$—)$_3$], δ=−127.5 ppm

[6F, —CF$_2$C$\underline{F}_2$CH$_2$OH—],

δ=−129.7 ppm

[26F, —CF$_2$C$\underline{F}_2$CF$_2$O—],

Z=4.3

$^1$H-NMR (solvent: perfluorobenzene, reference material: D$_2$O):

δ=3.72~4.18 ppm

[12H, —CF$_2$CF$_2$C$\underline{H}_2$OH, (CF$_3$C$_6$$\underline{H}_4$O)$_3$—P$_3$N$_3$—(OC$\underline{H}_2$CF$_2$CF$_2$—)$_3$]

δ=4.29~4.43 ppm

[3H, —CF$_2$CF$_2$CH$_2$O$\underline{H}$],

δ=7.08~7.65 ppm

[12H, (CF$_3$C$_6$$\underline{H}_4$O)$_3$—P$_3$N$_3$—(OCH$_2$CF$_2$CF$_2$—)$_3$]

EXAMPLE 3

Preparation of (m-CF$_3$—C$_6$H$_4$O)$_2$—(P$_3$N$_3$)—(O—CH$_2$—Rf—CH$_2$OH)$_4$ (Lubricant 3)

Rf is —CF$_2$O(CF$_2$CF$_2$O)$_x$(CF$_2$O)$_y$CF$_2$—

Dimethylformaldehyde (90 g), 90 g of a fluoropolyether (1056 in number average molecular weight, 1.25 in molecular weight distribution) of the formula HOCH$_2$—CF$_2$O(CF$_2$CF$_2$O)$_x$(CF$_2$O)$_y$CF$_2$CH$_2$—OH, 3,4-dihydro-2H-pyran (16 g) and p-toluenesulfonic acid (1 g) were stirred in an argon atmosphere at 30° C. for 24 hours. The reaction mixture was thereafter washed with water, dewatered and purified by silica gel column chromatography to obtain 55 g of a compound having one hydroxyl group at one terminal and a tetrahydropyranyl group at the other terminal. The compound (50 g) was dissolved in ditrifluoromethylbenzene (140 g), 6 g of cyclophosphazene of the formula (m-CF$_3$—C$_6$H$_4$O)$_2$—(P$_3$N$_3$)—Cl$_4$ having 4 chlorine atoms and metallic sodium (1.1 g) were added to the solution, and the mixture was stirred at 70° C. for 70 hours. The reaction mixture was then washed with water, and p-toluenesulfonic acid (20 g) was admixed with the mixture, followed by purification by column chromatography, whereby 27 g of the desired lubricant 3 was obtained.

Lubricant 3 was a colorless transparent liquid and had a density of 1.76 g/cm$^3$ at 20° C. Lubricant 3 was identified by NMR with the result shown.

$^{19}$F-NMR (solvent: none, reference material: OCF$_2$C$\underline{F}_2$CF$_2$O in the obtained product being taken as −125.8 ppm):

δ=−52.1, −53.7, −55.4 ppm

[37F, —OC$\underline{F}_2$O—],

δ=−64.1 ppm

[6F, (C$\underline{F}_3$C$_6$H$_4$O)$_2$—P$_3$N$_3$—(OCH$_2$CF$_2$)$_4$],

δ=−78.7 ppm, −80.7 ppm

[8F, (CF$_3$C$_6$H$_4$O)$_2$—P$_3$N$_3$—(OCH$_2$C$\underline{F}_2$)$_4$],

δ=−81.3 ppm, −83.3 ppm

[8F, —C$\underline{F}_2$CH$_2$OH],

δ=−89.1 ppm, −90.7 ppm

[80F, —OC$\underline{F}_2$C$\underline{F}_2$O—]

x=5.0 y=4.6

$^1$H-NMR (solvent: perfluorobenzene, reference material: D$_2$O):

δ=3.38~3.83 ppm

[16H, —CF$_2$CH$_2$OH, (CF$_3$C$_6$H$_4$O)$_2$—P$_3$N$_3$—(OCH$_2$CF$_2$—)$_4$],

δ=4.35~4.46 ppm

[4H, —CF$_2$CH$_2$OH],

δ=6.78~7.35 ppm

[8H, (CF$_3$C$_6$H$_4$O)$_2$—P$_3$N$_3$—(OCH$_2$CF$_2$—)$_4$]

EXAMPLE 4

Preparation of (m-CF$_3$—C$_6$H$_4$O)$_4$—(P$_3$N$_3$)—(O—CH$_2$—Rf—CH$_2$OH)$_2$(Lubricant 4)

Rf is —CF$_2$O(CF$_2$CF$_2$O)$_x$(CF$_2$O)$_y$CF$_2$—

Dimethylformaldehyde (90 g), 90 g of a fluoropolyether (1056 in number average molecular weight, 1.25 in molecular weight distribution) of the formula HOCH$_2$—CF$_2$O(CF$_2$CF$_2$O)$_x$(CF$_2$O)$_y$CF$_2$CH$_2$—OH, 3,4-dihydro-2H-pyran (16 g) and p-toluenesulfonic acid (1 g) were stirred in an argon atmosphere at 30° C. for 24 hours. The reaction mixture was thereafter washed with water, dewatered and purified by silica gel column chromatography to obtain 55 g of a compound having one hydroxyl group at one terminal and a tetrahydropyranyl group at the other terminal. The compound (50 g) was dissolved in ditrifluoromethylbenzene (140 g), 9 g of cyclophosphazene of the formula (m-CF$_3$—C$_6$H$_4$O)$_4$—(P$_3$N$_3$)—Cl$_2$ having 2 chlorine atoms and metallic sodium (1.1 g) were added to the solution, and the mixture was stirred at 70° C. for 70 hours. The reaction mixture was then washed with water, and p-toluenesulfonic acid (20 g) was admixed with the mixture, followed by purification by column chromatography, whereby 31 g of the desired lubricant 4 was obtained.

Lubricant 4 was a colorless transparent liquid and had a density of 1.73 g/cm$^3$ at 20° C. Lubricant 4 was identified by NMR with the result shown.

$^{19}$F-NMR (solvent: none, reference material: OCF$_2$CF$_2$CF$_2$CF$_2$O in the obtained product being taken as −125.8 ppm):

δ=−52.1, −53.7, −55.4 ppm

[18F, —OCF$_2$O—],

δ=−64.1 ppm

[12F, (CF$_3$C$_6$H$_4$O)$_4$—P$_3$N$_3$—(OCH$_2$CF$_2$—)$_2$],

δ=−78.7 ppm, −80.7 ppm

[4F, (CF$_3$C$_6$H$_4$O)$_4$—P$_3$N$_3$—(OCH$_2$CF$_2$—)$_2$],

δ=−81.3 ppm, −83.3 ppm

[4F, —CF$_2$CH$_2$OH],

δ=−89.1 ppm, −90.7 ppm

[39F, —OCF$_2$CF$_2$O—]

x=4.9 y=4.6

$^1$H-NMR (solvent: perfluorobenzene, reference material: D$_2$O):

δ=3.38~3.83 ppm

[8H, —CF$_2$CH$_2$OH, (CF$_3$C$_6$H$_4$O)$_4$—P$_3$N$_3$—(OCH$_2$CF$_2$—)$_2$],

δ=4.35~4.46 ppm

[2H, —CF$_2$CH$_2$OH],

δ=6.78~7.35 ppm

[16H, (CF$_3$C$_6$H$_4$O)$_4$—P$_3$N$_3$—(OCH$_2$CF$_2$]

TEST EXAMPLE 1

Measurement of Bonded Ratio

Each of Lubricants 1 to 4 prepared in Examples 1 to 4 was dissolved in Vertrel-XF, product of DuPont. The solution was 0.05 wt. % in the concentration of the lubricant. A magnetic disk, 3.5 inches in diameter, was immersed in the solution for 1 minute and then withdrawn at a rate of 2 mm/s. The disk was thereafter held in a constant-temperature chamber at 150° C. for 10 minutes to promote the adhesion of the lubricant to the disk surface. The average film thickness of the compound on the disk was subsequently measured by a Fourier Transform Infrared Spectrometer (FT-IR). This film thickness was taken as f Å. Next, the disk was immersed in Vertrel-XF for 10 minutes, withdrawn at a rate of 10 mm/s and thereafter allowed to stand at room temperature for the evaporation of the solvent. The compound remaining on the disk was thereafter checked by FT-IR for average film thickness. This film thickness was taken as b Å. The bonded ratio generally in use was used as an indicator for showing the strength of adhesion of the film to the disk. The bonded ratio was expressed by the equation given below.

Bonded ratio (%)=100×b/f

TEST EXAMPLE 2

Measurement of Viscosity

The lubricant was checked for absolute viscosity at 20° C. using E-type viscometer (Visconic ED), product of Tokyo Keiki Inc.

TEST EXAMPLE 3

Measurement of Decomposition Resistance to Aluminum Oxide

A sample was used for evaluation which was prepared from each of Lubricants 1 to 4, by adding 20 wt. % of Al$_2$O$_3$ to the lubricant, intensely shaking the mixture and thereafter thoroughly agitating the mixture with ultrasonic waves. The sample was checked for decomposition resistance using a thermal analyzer (TG/TDA). The sample was heated at 250° C. for 100 minutes, and the weight reduction of the lubricant was measured. The test was conducted with use of 20 mg of the sample under nitrogen atmosphere. For comparison, 20 mg of each of Lubricants 1 to 4 was thermally analyzed in the same manner as above with the exception of adding no Al$_2$O$_3$.

For comparison, Lubricant 5 and Lubricant 6 of the formula (I) below wherein n is 1 and n is 5, respectively, were used. Also used was Lubricant 7 corresponding to Lubricant 5 wherein —CH$_2$OH positioned at the terminal of Rf was modified to —CH$_2$OCH$_2$CH(OH)CH$_2$OH having both primary and secondary hydroxyl groups.

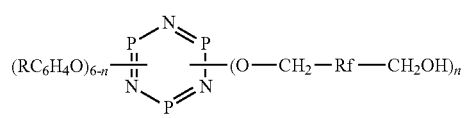

(I)

wherein R is m-CF$_3$, Rf is —CF$_2$O(CF$_2$CF$_2$O)$_x$(CF$_2$O)$_y$CF$_2$—, x is 4.9 and y is 4.7. The compound is 1.28 in molecular weight distribution.

When an attempt was made to prepare a lubricant according to Example 1 of Patent Literature 1 (JP2000-260017A), the product obtained was a rubberlike substance comprising a 6-membered ring phosphazene and a fluoropolyether which were polymerized into a complex structure. The object of the present invention is to propose a lubricant composition having resistance to decomposition and satisfactory in both adsorbing property and flowability. Apparently, the technique of Patent Literature 1 giving a rubberlike substance fails to fulfill the object of the invention.

Table 1 shows the results of Test Examples 1, 2 and 3. These results indicate the following. First, the lubricant of the invention is 1 in the number of substituent on the fluoropolyether main chain and exhibits satisfactory bonded ratio unlike Lubricant 5 having one hydroxyl group. With respect to absolute viscosity indicative of flowability, the lubricant of the invention has a lower viscosity than Lubricant 6 having five substituents on the fluoropolyether main chain and five hydroxyl groups in total and than Lubricant 7 having one substituent on the fluoropolyether main chain and two kinds of hydroxyl groups at one terminal of the main chain. As to the decomposition resistance to aluminum oxide, all the lubricants exhibited no marked increase in the weight reduction due to aluminum oxide and were satisfactory in decomposition resistance. Among these, the lubricant of the invention was almost free from weight reduction and found to be especially satisfactory. These results reveal that the fluoropolyether lubricant of the invention, which has both cyclophosphazene group and hydroxyl in the molecule and wherein the hydroxyl substituent is limited only to the primary and the number of substituents on the fluoropolyether main chain and the molecular weight are limited specifically, is resistant to decomposition and satisfactory in both adsorbing property and flowability (viscosity).

TABLE 1

| Specimen | Bonded ratio (%) | Absolute viscosity at 20° C. (mPa · s) |
| --- | --- | --- |
| Lubricant 1 (Example 1) | 68 | 550 |
| Lubricant 2 (Example 2) | 70 | 590 |
| Lubricant 3 (Example 3) | 71 | 980 |
| Lubricant 4 (Example 4) | 58 | 370 |
| Lubricant 5 (Com. Example) | 15 | 330 |
| Lubricant 6 (Com. Example) | 80 | 1780 |
| Lubricant 7 (Com. Example) | 67 | 3370 |

| Specimen | Ratio of decrease in weight (%) with Al$_2$O$_3$ | Ratio of decrease in weight (%) without Al$_2$O$_3$ |
| --- | --- | --- |
| Lubricant 1 (Example 1) | <1 | <1 |
| Lubricant 2 (Example 2) | <1 | <1 |
| Lubricant 3 (Example 3) | <1 | <1 |
| Lubricant 4 (Example 4) | <1 | <1 |
| Lubricant 5 (Com. Example) | 13 | 12 |
| Lubricant 6 (Com. Example) | <1 | <1 |
| Lubricant 7 (Com. Example) | 10 | 8 |

EXAMPLE 5

Preparation of Magnetic Disk

Each of Lubricants 1 to 4 was dissolved in Vertrel-XF, product of DuPont. The solution was 0.05 wt. % in the concentration of the compound. A magnetic disk, 3.5 inches in diameter, was immersed in the solution for 1 minute and then withdrawn at a rate of 2 mm/s. The disk was thereafter dried at 150° C. for 10 minutes. The coated compound was thereafter checked by FT-IR for film thickness.

Table 2 shows the results. It was confirmed that the magnetic disk can be obtained which is coated with the present lubricant and is satisfactory in both adhering properties and flowability.

TABLE 2

| Specimen | Film thickness (Å) |
| --- | --- |
| Lubricant 1 | 12 |
| Lubricant 2 | 11 |
| Lubricant 3 | 13 |
| Lubricant 4 | 12 |

Industrial Applicability

The invention provides a fluoropolyether lubricant which has cyclophosphazene and hydroxyl in the molecule and wherein the hydroxyl substitute is limited to the primary, the number of substitution on the cyclophosphazene ring of the fluoropolyether main chain is limited substantially to 2, 3 or 4, or substantially to 3 or 4 or substantially to a specific number of 3, the molecular weight and molecular weight distribution are further limited to specific values to make the lubricant resemble single compounds to the greatest possible extent, thereby rendering the lubricant resistant to decomposition and satisfactory in both adsorption to the disk and flowability thereon.

The invention claimed is:

1. A lubricant containing a compound of the formula (I)

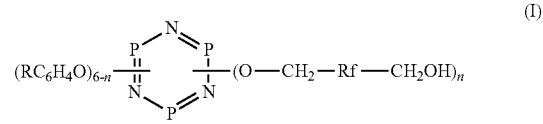

(I)

wherein n is 2, 3 or 4, R is C$_{1-4}$ fluoroalkyl and Rf is —CF$_2$CF$_2$O(CF$_2$CF$_2$CF$_2$O)$_z$CF$_2$CF$_2$— in which z is 0 or a positive real number to give a number average molecular weight of 500 to 2000 to a fluoropolyether of the formula HOCH$_2$—Rf—CH$_2$OH including said Rf, the fluoropolyether having a molecular weight distribution (PD, weight average molecular weight/number average molecular weight) of 1.0 to 1.5.

2. A lubricant as defined in claim 1 wherein n is 3 or 4, z is 0 or a positive real number to give the above number average molecular weight of 500 to 1500.

3. A lubricant as defined in claim 2 wherein n is 3, z is 0 or a positive real number to give the above number average molecular weight of 800 to 1200, and a molecular weight distribution of the fluoropolyether is 1.0 to 1.3.

4. A magnetic disk comprising a substrate having at least a recording layer and a protective layer formed thereover and a lubricating layer provided over the resulting surface, the lubricating layer containing a compound of the formula (I)

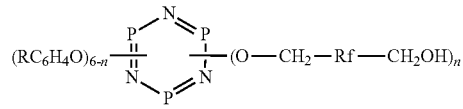
(I)

wherein n is 2, 3 or 4, R is $C_{1-4}$ fluoroalkyl and Rf is
—$CF_2CF_2O(CF_2CF_2CF_2O)_z CF_2CF_2$— in which z is 0 or a positive real number to give a number average molecular weight of 500 to 2000 to a fluoropolyether of the formula $HOCH_2$—Rf—$CH_2OH$ including said Rf, the fluoropolyether having a molecular weight distribution (PD, weight average molecular weight/number average molecular weight) of 1.0 to 1.5.

5. A magnetic disk as defined in claim 4 wherein n is 3 or 4, z is 0 or a positive real number to give the above number average molecular weight of 500 to 1500.

6. A magnetic disk as defined in claim 5 wherein n is 3, z is 0 or a positive real number to give the above number average molecular weight of 800 to 1200, and a molecular weight distribution of the fluoropolyether is 1.0 to 1.3.

7. A process for preparing a fluoropolyether of the formula (I) having a cyclophosphazene group and hydroxyl in the molecule, the process comprising reacting a straight-chain fluoropolyether represented by the formula $HOCH_2$—Rf—$CH_2OA$ wherein A is an acyl group or silyl group or alkyl group or alkoxyalkyl group or tetrahydrylpyranyl group with a cyclophosphazene compound represented by the formula $(RC_6H_4O)_{6-n}$—$(P_3N_3)$—$X_n$ and having n halogen atoms

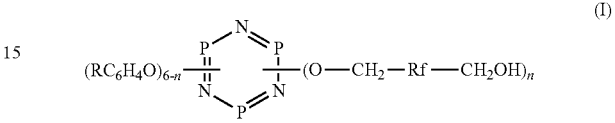
(I)

wherein n is 2,3 or 4, R is $C_{1-4}$ fluoroalkyl and Rf is
—$CF_2CF_2O(CF_2CF_2CF_2O)_Z CF_2CF_2$— in which z is 0 or a positive real number to give a number average molecular weight of 500 to 2000 to a fluoropolyether of the formula $HOCH_2$—Rf—$CH_2OH$ including said Rf, the fluoropolyether having a molecular weight distribution (PD, weight average molecular weight/number average molecular weight) of 1.0 to 1.5.

* * * * *